Nov. 6, 1928.
H. A. HALL
SAW GUARD
Filed July 26, 1927
1,690,817
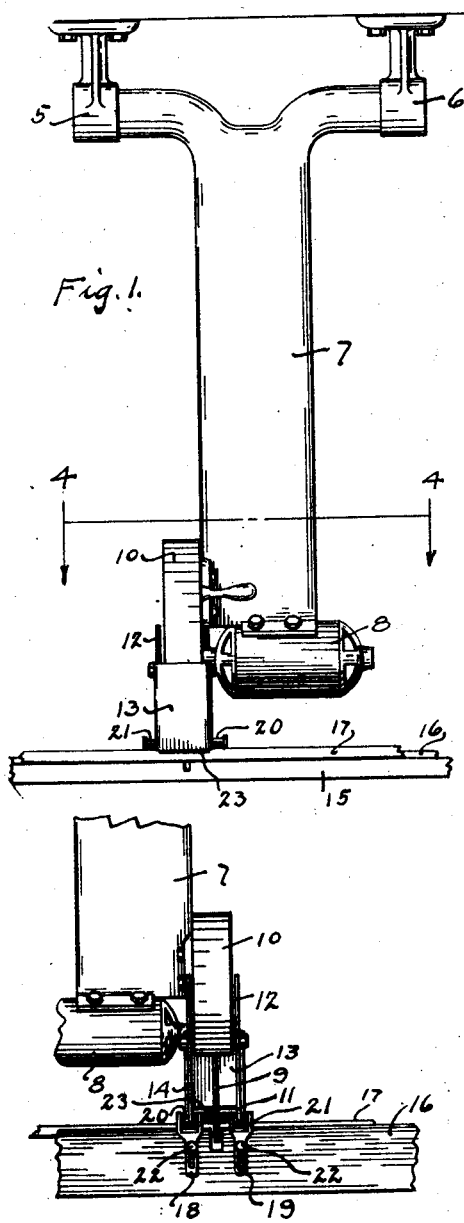
Fig. 1.
Fig. 3.
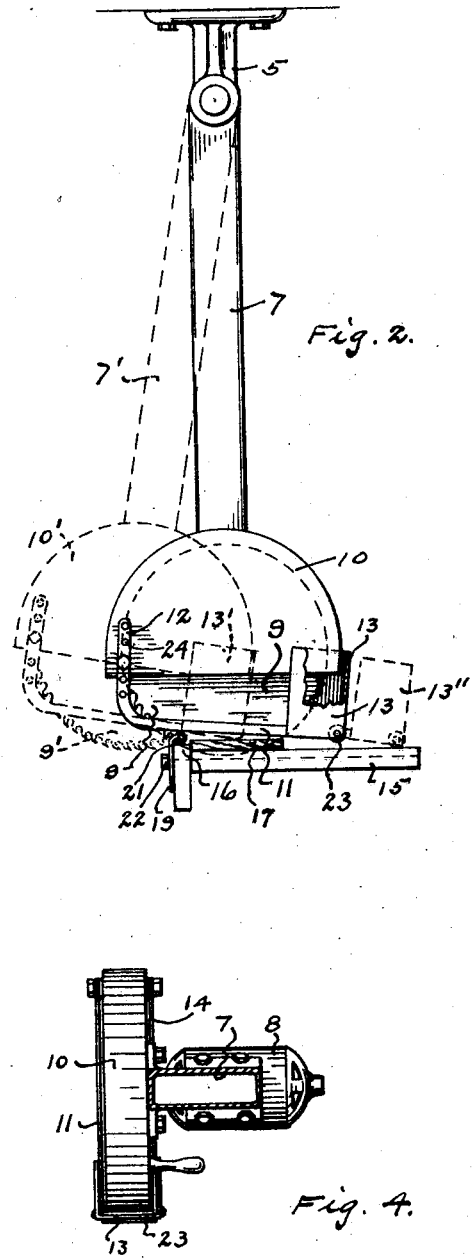
Fig. 2.
Fig. 4.
INVENTOR,
Harry A. Hall,
By Minturn & Minturn,
Attorneys.

Patented Nov. 6, 1928.

1,690,817

UNITED STATES PATENT OFFICE.

HARRY A. HALL, OF NEWCASTLE, INDIANA, ASSIGNOR TO THE HOOSIER MANUFACTURING COMPANY, OF NEWCASTLE, INDIANA, A CORPORATION OF INDIANA.

SAW GUARD.

Application filed July 26, 1927. Serial No. 208,564.

This invention relates to means for guarding a circular saw, and particularly to a swinging cut-off saw. I am aware of the fact that many guard devices have been developed to prevent the operator from accidentally coming in contact with a rapidly revolving saw, but it is the purpose of this invention to provide a guard that is extremely simple in operation and that does not depend upon the operation of cams or eccentrics to actuate it.

For a rapid rate of work conforming to modern high speed production methods, a swinging saw is employed that is set in motion by the operator pushing or pulling the saw from its central hanging position, whereupon the saw will continue to swing as a pendulum back and forth to cut through the lumber as presented with only a slight push or pull by the operator now and then to keep the saw swinging.

To properly guard such a swinging saw has presented a problem not successfully heretofore solved. My device provides a guard that accommodates itself to the lumber to be sawed and actually covers over the forward portion of the saw so that the operator can at no time leave his fingers in the path of the saw without their being pushed out of the way, and at the same time, the operation of the guard does not slow down in any way the rate of production.

The invention is described with reference being made to the accompanying drawing, in which—

Fig. 1 is a front elevation of a swinging cut-off saw with my invention applied thereto;

Fig. 2, a side elevation of the saw from the saw side;

Fig. 3, a fragmentary rear elevation of the saw; and

Fig. 4, a transverse horizontal section on the line 4—4 in Fig. 1.

Like characters of reference indicate like parts throughout the several views.

Between the two hangers 5 and 6, is hung the saw frame 7 to be free to swing therebetween. On the lower end of the frame 7 is carried an electric motor 8, and the circular saw 9 is secured directly on the end of the motor shaft to be revolved in a vertical plane to one side of the frame 7.

The upper portion of the saw is enclosed by the housing or hood 10 which is carried by the frame 7, and does not change its position in relation to the saw 9.

An L-shaped arm 11 is pivotally mounted to swing freely from a point on the side of the hood 10 near its lower rear edge by the vertical leg 12 of the arm, and the horizontal leg of the arm 11 extends forwardly along side of the saw 9 to engage one side of the guard 13. Similarly, the arm 14 is pivoted to the other side of the hood 10 at a corresponding point to pass forwardly along the other side of the saw 9 to engage the other side of the guard 13.

The guard 13 is U-shaped in cross-section, and is positioned by the arms 11 and 14 to pass freely up over and around the forward end of the hood 10 to have its sides extending along side of the hood, as the guard may be swung with the arms 11 and 14.

The usual table 15 is presented below the saw 9 on which the board to be cut off is placed. A back stop 16 is provided against which the board 17 is pushed. Secured to the stop 16 are brackets 18 and 19 which carry the rollers 20 and 21. The brackets are provided with slots so that they may be adjusted in vertical position by the cap screws 22.

Referring to Fig. 2, the saw 9 is swung back to the position 9' as indicated by the dash line position. In swinging back, the arms 11 and 14 are pulled back accordingly and they ride over the rollers 20 and 21, the height of which determine the distance the guard 13 is carried along above the table 15. In practice, this distance is such that the guard practically touches the table and is only increased as the saw swings clear of the table behind so that the board may be slipped under the guard 13 against the stop 16 before the saw swings back over the table again.

As the saw 9 swings forwardly from the position 9', the guard 13 takes successive positions from the position 13', the solid line position (Fig. 2), and through the position 13". By following these positions it will be seen that as the saw is passing through the board 17, the guard 13 is practically sliding over the surface of the board ahead of the saw a substantial distance, and as the saw emerges from the board 17, the guard drops down toward the table 15, with the result that at no time is the guard 13 a sufficient distance above the work or table to allow the fingers of the operator to be in danger from the saw 9. The guard 13 in effect drags to and fro across on the table 15 and the board 17 as may be on it, and a roller 23 is positioned at the extreme bottom front edge of the guard 13 to reduce friction and danger of catching as the guard 13 may contact the board or table.

The arms 11 and 14 are provided with a series of holes 24 to permit vertical adjustment of the arms in accordance with the height of the table 15 and the thickness of the boards to be sawed, and in some cases the arm support rollers 20 and 21 are dispensed with and the arms 11 and 14 then slide over the edge of the stop 16 which is in such cases extended to above the thickness of the board 17.

While I have here described my invention in one particular form, I do not desire to be limited to the precise structure as shown, nor any more than may be required by the following claims, since it is obvious that structural changes may be made to adapt the invention to various types of swinging saws without departing from the spirit of the invention.

I claim:

1. The combination with a swinging circular saw and a table over which the saw swings, of a hood fixed over the upper portion of the saw to swing with the saw, a second movable hood substantially U-shaped resting on the table telescoping over and around the forward end of the fixed hood, and an arm attached to each side of the movable hood, each of said arms passing backwardly along the saw in relatively close proximity to the table and thence upwardly to be pivotally attached to the fixed hood back of the axis of the saw.

2. The combination with a swinging circular saw and a table over which the saw swings, of a hood fixed over the upper portion of the saw to swing with the saw, a second movable hood substantially U-shaped resting on the table telescoping over and around the forward end of the fixed hood, and an arm attached to each side of the movable hood, each of said arms passing backwardly along the saw in relatively close proximity to the table and thence upwardly to be pivotally attached to the fixed hood back of the axis of the saw and means for adjusting the arms from the hood to obtain a substantially parallel relation between the arms and the table during the swinging of the saw.

3. The combination with a swinging circular saw and a table over which the saw swings, of a hood fixed over the upper portion of the saw to swing with the saw, a second movable hood substantially U-shaped resting on the table telescoping over and around the forward end of the fixed hood, and an arm attached to each side of the movable hood, each of said arms passing backwardly along the saw in relatively close proximity to the table and thence upwardly to be pivotally attached to the fixed hood back of the axis of the saw and guides carried by the table over which the arms ride.

4. The combination with a swinging circular saw and a table over which the saw swings, of a hood fixed over the upper portion of the saw to swing with the saw, a second movable hood substantially U-shaped resting on the table telescoping over and around the forward end of the fixed hood, and an arm attached to each side of the movable hood, each of said arms passing backwardly along the saw in relatively close proximity to the table and thence upwardly to be pivotally attached to the fixed hood back of the axis of the saw, means for adjustably changing the elevation of the arms in relation to the fixed hood, and guides supported by the table over which the arms ride, said guides being cooperatively adjustable in relation to said first adjustable means.

In testimony whereof I affix my signature.

HARRY A. HALL.